(12) United States Patent
Kelkar et al.

(10) Patent No.: US 7,509,353 B2
(45) Date of Patent: Mar. 24, 2009

(54) METHODS AND SYSTEMS FOR EXCHANGING AND RENDERING FORMS

(75) Inventors: Amol S Kelkar, Redmond, WA (US); David Airapetyan, Kirkland, WA (US); Prakash Sikchi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 10/990,016

(22) Filed: Nov. 16, 2004

(65) Prior Publication Data

US 2006/0168527 A1    Jul. 27, 2006

(51) Int. Cl.
*G06F 17/00* (2006.01)
*G06F 7/00* (2006.01)
*G06F 12/00* (2006.01)
*G06F 17/30* (2006.01)

(52) U.S. Cl. .................. 707/203; 707/100; 707/200

(58) Field of Classification Search ................ 707/203, 707/204, 200, 205, 100, 202, 208, 209, 217, 707/218, 219; 705/26, 27; 715/212, 221, 715/227, 222, 223
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,933,880 A | 6/1990 | Borgendale et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,179,703 A | 1/1993 | Evans | |
| 5,182,709 A | 1/1993 | Makus | |

(Continued)

FOREIGN PATENT DOCUMENTS

EP    0841615    11/1999

(Continued)

OTHER PUBLICATIONS

Fontelo et al. Acessing MEDLINE/PubMed with Handheld Devices: Developments and New Search Portals, System Science, 2005, HICSS 05, Proceeding of the 38th International Conference, Jan. 3-6, 2005, pp. 158b-158b.*

(Continued)

*Primary Examiner*—Baoquoc N To (57) ABSTRACT

Various embodiments can support a richly dynamic form environment that permits editing on the client side and can alleviate many of the server-imposed processing complexities that have existed in the past. In at least some embodiments, complex editing scenarios permit users to make complex editing changes on a form, and have those editing changes captured and rendered on the client side for later communication to the server. Particular aspects of at least some of the embodiments can permit scalability, and can, in at least some instances, be employed in the context of a wide variety of browsers having different levels of capability, e.g. "thin" and "thick" browsers.

6 Claims, 5 Drawing Sheets

U.S. PATENT DOCUMENTS

| | | |
|---|---|---|
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,070,184 A | 5/2000 | Blount et al. |

| | | | |
|---|---|---|---|
| 6,072,870 A | 6/2000 | Nguyen et al. | |
| 6,078,326 A | 6/2000 | Kilmer et al. | |
| 6,078,327 A | 6/2000 | Liman et al. | |
| 6,078,924 A | 6/2000 | Ainsbury et al. | |
| 6,081,610 A | 6/2000 | Dwork et al. | |
| 6,084,585 A | 7/2000 | Kraft et al. | |
| 6,088,708 A | 7/2000 | Burch et al. | |
| 6,091,417 A | 7/2000 | Lefkowitz | |
| 6,094,657 A | 7/2000 | Hailpern et al. | |
| 6,097,382 A | 8/2000 | Rosen et al. | |
| 6,098,081 A | 8/2000 | Heidorn et al. | |
| 6,108,637 A | 8/2000 | Blumenau | |
| 6,108,783 A | 8/2000 | Krawczyk et al. | |
| 6,115,646 A | 9/2000 | Fiszman et al. | |
| 6,121,965 A | 9/2000 | Kenney et al. | |
| 6,122,647 A | 9/2000 | Horowitz | |
| 6,144,969 A | 11/2000 | Inokuchi et al. | |
| 6,151,624 A | 11/2000 | Teare et al. | |
| 6,154,128 A | 11/2000 | Wookey et al. | |
| 6,163,772 A | 12/2000 | Kramer et al. | |
| 6,167,521 A | 12/2000 | Smith et al. | |
| 6,167,523 A | 12/2000 | Strong | |
| 6,182,094 B1 | 1/2001 | Humpleman et al. | |
| 6,182,095 B1 | 1/2001 | Leymaster et al. | |
| 6,188,401 B1 | 2/2001 | Peyer | |
| 6,191,797 B1 | 2/2001 | Politis | |
| 6,192,367 B1 | 2/2001 | Hawley et al. | |
| 6,195,661 B1 | 2/2001 | Filepp et al. | |
| 6,199,204 B1 | 3/2001 | Donohue | |
| 6,209,128 B1 | 3/2001 | Gerard et al. | |
| 6,216,152 B1 | 4/2001 | Wong et al. | |
| 6,219,698 B1 | 4/2001 | Iannucci et al. | |
| 6,225,996 B1 | 5/2001 | Gibb et al. | |
| 6,235,027 B1 | 5/2001 | Herzon | |
| 6,253,366 B1 | 6/2001 | Mutschler, III | |
| 6,253,374 B1 | 6/2001 | Dresevic et al. | |
| 6,263,313 B1 | 7/2001 | Milsted et al. | |
| 6,266,810 B1 | 7/2001 | Tanaka et al. | |
| 6,268,852 B1 | 7/2001 | Lindhorst et al. | |
| 6,272,506 B1 | 8/2001 | Bell | |
| 6,275,227 B1 | 8/2001 | DeStefano | |
| 6,275,599 B1 | 8/2001 | Adler et al. | |
| 6,279,042 B1 | 8/2001 | Ouchi | |
| 6,281,896 B1 | 8/2001 | Alimpich et al. | |
| 6,282,711 B1 | 8/2001 | Halpern et al. | |
| 6,286,033 B1 | 9/2001 | Kishinsky et al. | |
| 6,292,897 B1 | 9/2001 | Gennaro et al. | |
| 6,297,819 B1 | 10/2001 | Furst | |
| 6,300,948 B1 | 10/2001 | Geller et al. | |
| 6,307,955 B1 | 10/2001 | Zank et al. | |
| 6,308,179 B1 | 10/2001 | Petersen et al. | |
| 6,308,273 B1 | 10/2001 | Goertzel et al. | |
| 6,311,271 B1 | 10/2001 | Gennaro et al. | |
| 6,314,415 B1 | 11/2001 | Mukherjee | |
| 6,321,259 B1 | 11/2001 | Ouellette et al. | |
| 6,321,334 B1 | 11/2001 | Jerger et al. | |
| 6,327,628 B1 | 12/2001 | Anuff et al. | |
| 6,331,864 B1 | 12/2001 | Coco et al. | |
| 6,342,907 B1 | 1/2002 | Petty et al. | |
| 6,343,149 B1 | 1/2002 | Motoiwa | |
| 6,343,302 B1 | 1/2002 | Graham | |
| 6,345,256 B1 | 2/2002 | Milsted et al. | |
| 6,345,278 B1 | 2/2002 | Hitchcock et al. | |
| 6,345,361 B1 | 2/2002 | Jerger et al. | |
| 6,347,323 B1 | 2/2002 | Garber et al. | |
| 6,349,408 B1 | 2/2002 | Smith | |
| 6,351,574 B1 | 2/2002 | Yair et al. | |
| 6,353,851 B1 | 3/2002 | Anupam et al. | |
| 6,353,926 B1 | 3/2002 | Parthesarathy | |
| 6,356,906 B1 | 3/2002 | Lippert et al. | |
| 6,357,038 B1 | 3/2002 | Scouten | |
| 6,366,907 B1 | 4/2002 | Fanning et al. | |
| 6,366,912 B1 | 4/2002 | Wallent et al. | |
| 6,367,013 B1 | 4/2002 | Bisbee et al. | |
| 6,369,840 B1 | 4/2002 | Barnett et al. | |
| 6,369,841 B1 | 4/2002 | Salomon et al. | |
| 6,374,402 B1 | 4/2002 | Schmeidler et al. | |
| 6,381,742 B2 | 4/2002 | Forbes et al. | |
| 6,381,743 B1 | 4/2002 | Mutschler, III | |
| 6,389,434 B1 | 5/2002 | Rivette | |
| 6,393,456 B1 | 5/2002 | Ambler et al. | |
| 6,396,488 B1 | 5/2002 | Simmons et al. | |
| 6,405,221 B1 | 6/2002 | Levine et al. | |
| 6,405,238 B1 | 6/2002 | Votipka | |
| 6,408,311 B1 | 6/2002 | Baisley et al. | |
| 6,414,700 B1 | 7/2002 | Kurtenbach et al. | |
| 6,421,070 B1 | 7/2002 | Ramos et al. | |
| 6,421,656 B1 | 7/2002 | Cheng et al. | |
| 6,425,125 B1 | 7/2002 | Fries et al. | |
| 6,429,885 B1 | 8/2002 | Saib et al. | |
| 6,434,563 B1 | 8/2002 | Pasquali et al. | |
| 6,434,564 B2 | 8/2002 | Ebert | |
| 6,442,563 B1 | 8/2002 | Bacon et al. | |
| 6,442,755 B1 | 8/2002 | Lemmons et al. | |
| 6,446,110 B1 | 9/2002 | Lection et al. | |
| 6,449,617 B1 | 9/2002 | Quinn et al. | |
| 6,457,009 B1 | 9/2002 | Bollay | |
| 6,460,058 B2 | 10/2002 | Koppulu | |
| 6,463,419 B1 * | 10/2002 | Kluss | 705/26 |
| 6,470,349 B1 | 10/2002 | Heninger | |
| 6,473,800 B1 | 10/2002 | Jerger et al. | |
| 6,476,828 B1 | 11/2002 | Burkett et al. | |
| 6,476,833 B1 | 11/2002 | Moshfeghi | |
| 6,477,544 B1 | 11/2002 | Bolosky | |
| 6,480,860 B1 | 11/2002 | Monday | |
| 6,487,566 B1 | 11/2002 | Sundaresan | |
| 6,490,601 B1 | 12/2002 | Markus et al. | |
| 6,493,702 B1 | 12/2002 | Adar et al. | |
| 6,501,864 B1 | 12/2002 | Eguchi et al. | |
| 6,502,101 B1 | 12/2002 | Verprauskus et al. | |
| 6,502,103 B1 | 12/2002 | Frey et al. | |
| 6,505,200 B1 | 1/2003 | Ims et al. | |
| 6,505,230 B1 | 1/2003 | Mohan et al. | |
| 6,505,300 B2 | 1/2003 | Chan et al. | |
| 6,507,856 B1 | 1/2003 | Chen et al. | |
| 6,516,322 B1 | 2/2003 | Meredith | |
| 6,519,617 B1 | 2/2003 | Wanderski et al. | |
| RE38,070 E | 4/2003 | Spies et al. | |
| 6,546,546 B1 | 4/2003 | Van Doorn | |
| 6,549,221 B1 | 4/2003 | Brown et al. | |
| 6,549,878 B1 | 4/2003 | Lowry et al. | |
| 6,549,922 B1 | 4/2003 | Srivastava et al. | |
| 6,553,402 B1 | 4/2003 | Makarios et al. | |
| 6,560,616 B1 | 5/2003 | Garber | |
| 6,560,620 B1 | 5/2003 | Ching | |
| 6,560,640 B2 | 5/2003 | Smethers | |
| 6,563,514 B1 | 5/2003 | Samar | |
| 6,571,253 B1 | 5/2003 | Thompson et al. | |
| 6,578,144 B1 | 6/2003 | Gennaro et al. | |
| 6,581,061 B2 | 6/2003 | Graham | |
| 6,584,469 B1 | 6/2003 | Chiang et al. | |
| 6,584,548 B1 | 6/2003 | Bourne et al. | |
| 6,585,778 B1 | 7/2003 | Hind et al. | |
| 6,589,290 B1 | 7/2003 | Maxwell et al. | |
| 6,594,686 B1 | 7/2003 | Edwards et al. | |
| 6,598,219 B1 | 7/2003 | Lau | |
| 6,603,489 B1 | 8/2003 | Edlund et al. | |
| 6,604,099 B1 | 8/2003 | Chung et al. | |
| 6,606,606 B2 | 8/2003 | Starr | |
| 6,609,200 B2 | 8/2003 | Anderson et al. | |
| 6,611,822 B1 | 8/2003 | Beams et al. | |
| 6,611,840 B1 | 8/2003 | Baer et al. | |
| 6,611,843 B1 | 8/2003 | Jacobs | |
| 6,613,098 B1 | 9/2003 | Sorge et al. | |
| 6,615,276 B1 | 9/2003 | Mastrianni et al. | |
| 6,629,109 B1 | 9/2003 | Koshisaka | |

| | | |
|---|---|---|
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin |
| 6,751,777 B2 | 6/2004 | Bates |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,871,220 B1 | 3/2005 | Rajan et al. |
| 6,874,130 B1 | 3/2005 | Baweja et al. |
| 6,876,996 B2 | 4/2005 | Czajkowski et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B1 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,954,754 B2 * | 10/2005 | Peng ................ 707/10 |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,722 B2 | 2/2006 | Rothchiller et al. |
| 7,010,580 B1 | 3/2006 | Fu et al. |
| 7,020,869 B2 | 3/2006 | Abriari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,051,273 B1 | 5/2006 | Holt et al. |
| 7,058,663 B2 * | 6/2006 | Johnston et al. .............. 707/200 |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,120,863 B1 | 10/2006 | Wang |
| 7,130,885 B2 | 10/2006 | Chandra et al. |
| 7,143,341 B1 * | 11/2006 | Kohli ................ 715/234 |
| 7,146,564 B2 | 12/2006 | Kim et al. |
| 7,152,205 B2 | 12/2006 | Day et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,200,816 B2 | 4/2007 | Falk et al. |
| 7,213,200 B2 | 5/2007 | Abe et al. |
| 7,236,982 B2 | 6/2007 | Zlatanov et al. |
| 7,249,328 B1 | 7/2007 | Davis |
| 7,272,789 B2 | 9/2007 | O'Brien |
| 7,281,018 B1 | 10/2007 | Begun et al. |
| 7,284,208 B2 | 10/2007 | Matthews |
| 7,287,218 B1 | 10/2007 | Knotz et al. |
| 7,296,017 B2 | 11/2007 | Larcheveque et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,178 B1 | 2/2008 | Stanciu et al. |
| 7,337,391 B2 | 2/2008 | Clarke et al. |
| 7,337,392 B2 | 2/2008 | Lue |
| 7,346,610 B2 | 3/2008 | Ruthfield et al. |
| 7,346,840 B1 | 3/2008 | Ravishankar et al. |
| 7,346,848 B1 | 3/2008 | Ruthfield et al. |
| 7,350,141 B2 | 3/2008 | Kotler et al. |
| 7,373,595 B2 | 5/2008 | Jones et al. |
| 7,412,649 B2 | 8/2008 | Emek et al. |
| 7,424,671 B2 | 9/2008 | Elza et al. |
| 7,428,699 B1 | 9/2008 | Kane et al. |
| 2001/0007109 A1 | 7/2001 | Lange |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0054004 A1 | 12/2001 | Powers |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk, Jr. et al. |
| 2002/0010855 A1 | 1/2002 | Reshef et al. |
| 2002/0013788 A1 | 1/2002 | Pennell et al. |

| | | |
|---|---|---|
| 2002/0019941 A1 | 2/2002 | Chan et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0054126 A1 | 5/2002 | Gamon |
| 2002/0057297 A1 | 5/2002 | Grimes et al. |
| 2002/0065798 A1 | 5/2002 | Bostleman et al. |
| 2002/0065847 A1 | 5/2002 | Furukawa et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083318 A1 | 6/2002 | Larose |
| 2002/0099952 A1 | 7/2002 | Lambert et al. |
| 2002/0100027 A1 | 7/2002 | Binding et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178380 A1 | 11/2002 | Wolf et al. |
| 2002/0184219 A1 | 12/2002 | Preisig et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0028561 A1* | 2/2003 | Gounares et al. ............ 707/513 |
| 2003/0037303 A1 | 2/2003 | Bodlaender |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe |
| 2003/0061386 A1 | 3/2003 | Brown et al. |
| 2003/0061567 A1 | 3/2003 | Brown et al. |
| 2003/0084424 A1 | 5/2003 | Reddy et al. |
| 2003/0093755 A1 | 5/2003 | O'Carroll |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne |
| 2003/0142072 A1 | 7/2003 | Lapstun et al. |
| 2003/0149934 A1 | 8/2003 | Worden |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0182268 A1 | 9/2003 | Lal |
| 2003/0182327 A1* | 9/2003 | Ramanujam et al. ........ 707/204 |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200506 A1 | 10/2003 | Abe et al. |
| 2003/0204511 A1 | 10/2003 | Brundage |
| 2003/0204814 A1 | 10/2003 | Elo et al. |
| 2003/0205615 A1 | 11/2003 | Marappan |
| 2003/0212664 A1 | 11/2003 | Breining et al. |
| 2003/0212902 A1 | 11/2003 | van der Made |
| 2003/0217053 A1 | 11/2003 | Bachman et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri et al. |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora |
| 2004/0002950 A1 | 1/2004 | Brennan et al. |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0010752 A1 | 1/2004 | Chan et al. |
| 2004/0024842 A1 | 2/2004 | Witt |
| 2004/0030991 A1 | 2/2004 | Hepworth et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0054966 A1 | 3/2004 | Busch et al. |
| 2004/0059754 A1 | 3/2004 | Barghout et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0088652 A1 | 5/2004 | Abe et al. |
| 2004/0093596 A1 | 5/2004 | Koyano |
| 2004/0107367 A1 | 6/2004 | Kisters |
| 2004/0117769 A1 | 6/2004 | Lauzon |
| 2004/0123277 A1 | 6/2004 | Schrader et al. |
| 2004/0146199 A1 | 7/2004 | Berkner et al. |
| 2004/0148178 A1 | 7/2004 | Brain |
| 2004/0163041 A1 | 8/2004 | Engel |
| 2004/0172442 A1 | 9/2004 | Ripley |
| 2004/0181711 A1 | 9/2004 | Johnson et al. |
| 2004/0186762 A1 | 9/2004 | Beaven et al. |
| 2004/0189708 A1 | 9/2004 | Larcheveque et al. |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |

| | | |
|---|---|---|
| 2004/0210645 A1 | 10/2004 | Kouznetsov et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0260593 A1 | 12/2004 | Abraham-Fuchs et al. |
| 2004/0261019 A1 | 12/2004 | Imamura et al. |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0028073 A1 | 2/2005 | Henry et al. |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1* | 6/2005 | Pecht-Seibert ............... 707/203 |
| 2005/0138539 A1 | 6/2005 | Bravery et al. |
| 2005/0149375 A1 | 7/2005 | Wefers |
| 2005/0160398 A1 | 7/2005 | Bjornson et al. |
| 2005/0171746 A1 | 8/2005 | Thalhammer-Reyero |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0246304 A1 | 11/2005 | Knight et al. |
| 2005/0262112 A1 | 11/2005 | Moore |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0129583 A1 | 6/2006 | Catorcini et al. |
| 2006/0129978 A1 | 6/2006 | Abriani et al. |
| 2006/0143220 A1 | 6/2006 | Spencer, Jr. |
| 2006/0161559 A1 | 7/2006 | Bordawekar et al. |
| 2006/0200754 A1 | 9/2006 | Kablesh et al. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0094589 A1 | 4/2007 | Paoli |
| 2007/0100877 A1 | 5/2007 | Paoli |
| 2007/0101280 A1 | 5/2007 | Paoli |
| 2007/0118803 A1 | 5/2007 | Walker et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2008/0028340 A1 | 1/2008 | Davis |

FOREIGN PATENT DOCUMENTS

| | | |
|---|---|---|
| EP | 0961197 | 12/1999 |
| EP | 1076290 | 2/2001 |
| JP | 63085960 | 4/1988 |
| JP | 401173140 | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 3191429 | 1/2000 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |

OTHER PUBLICATIONS

Baraglia et al. Dynamic personalizing of web sites without user intervention, Communication of the ACM, vol. 50, Issue 2, Feb. 2007.*
"Webopedia Computer Dictionary" retrieved on May 9, 2006, at <<http://www.pewebopedia.com/TERM/O/OLE.html>>, Jupitermedia Corporation, 2006, pp. 07.
Cover, XML Forms Architecture, retrieved at << http://xml.coverpages.org/xfa.html>> on Aug. 17, 2006, Coverpages, Jun. 16, 1999.
Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.
Altova, Inc., "XML Spy 4.0 Manual," Altova Inc. & Altova GmbH, coyright 1998-2001, Chapters 1, 2, and 6, encompassing pp. 1-17, 18-90, and 343-362.
Cybook, Inc.: "Copying the Search Form to Services-based Web Sites" INternet Article, (online) Jul. 26, 2004. *the whole document*.
Macromedia, Inc.: "Dreamweaver Technote, Changes in copying and pasting in Dreamweaver 4" Internet Article (online). *the whole document*.
Rado, Dave: "How to create a template that makes it easy for users to "fill in the blanks", without doing any programming" Microsoft Word MVP FAQ Site, (online) Apr. 30, 2004, the whole document.
Ben-Natan, U.S. Appl. No. 60/203,081, filed May 9, 2000, entitled "Internet platform for creating and supporting communities".
Excel Developer Tip (hereinafter "Excel"), "Determining the Data Type of a Cell", May 13, 1998, p. 1 (available at http://jwalk.com/ss//excel/tips/tip62.htm).
Kutay, U.S. Appl. No. 60/209,713, filed Jun. 5, 2000, entitled, "Methods and systems for accessing, organizing presenting and viewing data".
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
Microsoft Corporation, "Microsoft Computer Dictionary" Microsoft Press, Fifth Edition, p. 149.
"Architecture for a Dynamic Information Area Control" IBM Technical Disclosure Bulletin IBM Corp. New York US vol. 37 No. 10 Jan. 10, 1994. pp. 245-246.

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Laura Acklen & Read Gilgen, "Using corel Wordperfect 9", 251-284, 424-434, 583-586 (1998).

Leblond et al, "PC Magazine Guide to Quattro Pro for Windows", pp. 9-11, 42-61, Ziff-Davis Press, Copyright 1993 by the LeBlond Group.

Microsoft Visual Basic 5.0 Programmer's Guide 1997; pp. 578-579;Redmond WA 98052-6399.

Excel 97 for Busy People Published by Osborne/Mcgraw-Hill 1997 pp. 48-50.

Rapaport L; "Get more from SharePoint" Transform Magazine vol. 11 No. 3. Mar. 2002 pp. 1315.

Musgrave S; "Networking technology—impact and opportunities" Survey and Statistical Computing 1996. Proceedings of the Second ASC International Conference. Sep. 1996. pp. 369-378. London UK.

McCright J.S.; "New Tool Kit to Link Groove with Microsoft Sharepoint" eWeek Enterprise News & Reviews Ziff Davis Media Inc. Jul. 29, 2002.

Description of Whitehill Composer software product producted by Whitehill Technologies Inc. available at <http://www.xml.com/pub/p/221> accessed on Apr. 8, 2004, two pages.

Clark James—W3C Editor; "XSL Transformation (XSLT) Version 1.0" Nov. 16, 1999 W3C (MIT INRIA Kejo) pp. 1-156.

Object Management Group, XML Metadata Interchange (XMI) Specification Version 1.2 Jan. 2002.

W3C Editor James Clark and Ste; "XML Path Language (XPath) Version 1.0" Nov. 16, 1999 W3C (MIT INRIA Kejo) pp. 1-49.

Staneck W., "Internal and External Media" Electronic Publishing Unleashed, 1995, Chapter 22, pp. 510-542.

Pike et al., "The Use of Name Spaces in Plan 9," Operating Systems Review vol. 27, No. 2, Apr. 1993, pp. 72-76.

Pike et al., "Plan 9 from Bell Labs" UKUUG, Summer 1990, 10 pages.

Peterson B. , "Unix Variants," Unix Review, vol. 10, No. 4, Apr. 1992, pp. 29-31.

Kobayashi et al., "An Update on BTRON-specification OS Development" IEEE 1991, pp. 132-140.

Herzner et al., "CDAM- Compound Document Access and Management. An Object-Oriented Approach" Multimedia Systems Interaction and Applications, 1992, Chapter 3, pp. 17-36.

DiLascia et al., "Sweeper" Microsoft Interactive Developer, vol. 1, No. 1, 1996, 27 pages.

Clapp D., "The NeXT Application Kit Part I: Non-Responsive Classes," The NeXT Bible 1990, Chapter 16, pp. 275-293.

Berg A., "Naming and Binding: Monikers" Inside OLE, 1995, Chapter 9, pp. 431-490.

Barker et al., "Creating In-Line Objects Within An Integrated Editing Enviroment," IBM Technical Disclosure Bulletin, vol. 27, No. 5, Oct. 1984, p. 2962.

"Store and Organize Related Project Files in a Binder," Getting Results with Microsoft Office, 1990, pp. 109-112.

Zdonik S., "Object Management Sytem Concepts," ACM, 1984, pp. 13-19.

Trupin J., "The Visual Programmer," Microsoft Systems Journal, Apr. 1996, pp. 103-105.

Schmid et al., "Protecting Data for Malicious Sofftware"; 18th Annual Computer Security Application Conference; 2002; pp. 199-208.

Prevelakis et al., "Sandboxing Applications"; Proceedings of the FREENIX Track; 2001; pp. 119-126.

Sun Q. et al., "A robust and secure media signature scheme for JPEG images" Proceedings of 2002 IEEE Workshop on Multimedia Signal Processing, Dec. 2002, pp. 296-299.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

"A tour of Xmetal" O'Reilly XML.Com 'Online Jul. 14, 1999 XP002230081 retrieved from the internet: <URL:http://www.xml.com/pub/a/SeyboldReport/ip0311025.html> retrieved on Feb. 5, 2003.

"Netscape Communicator's Collapsible Toolbars" CHI'98 Human Factors in Computing Systems Conference Proceedings Los Angeles CA Apr. 18-23, 1998 pp. 81-86.

"Flexible Information Presentation with XML" 1998 The Institution of Electrical Engineers 6 pages.

"Arbortext Adept 8 Editor Review" O'Reilly XML.Com 'Online! Sep. 22, 1999 XP002230080 retrieved from the Internet <URL:http://www.xml.com/pub/a/1999/09/adept/AdeptRvw.htm> retrieved on Feb. 5, 2003.

"XKvalidator: A Constraint Validator for XML" CIKM '-2 Nov. 4-9, 2002 Copyright 2002 ACM 1-58113-492-4/02/0011 pp. 446-452.

"Designing Valid XML Views" ER 2002 LNCS 2503 2002 Springer-Verlag Berlin Heidelberg 2002 pp. 463-477.

Efficient Management of Multiversion Documents by Object Referencing Proceedings of the 27th VLDB Conference 2001 pp. 291-300.

"Efficient schemes for managing mulitversion XML documents" VLDB Journal (2002) pp. 332-352.

"Storing and Querying Multiversion XML Documents using Durable Node Numbers" IEEE 2002 pp. 232-241.

"XML Document Versioning" SIGMOD Record vol. 30 No. 3 Spet 2001 pp. 46-53.

"Generic Validation of Structural Content with Parametric Modules" ICFP '01 Sep. 3-5, 2001 Copyright 2001 ACM 1-58113-415-0/01/0009 pp. 98-109.

"Managing Complex Documents Over the WWW: A Case Study for XML" IEEE Transactions on Knowledge and Data Engineering Vo.1. 11 No. 4 Jul./Aug. 1999. pp. 629-938.

"From small beginnings" Knowledge Management Nov. 2001 pp. 28-30.

"XML Editors: Allegations of Functionality in search of reality" Internet 'Online! 1999 XP002230082 retrieved from the Internet <URL:http://www.ivritype.com/xml/>.

"Photo Shop 5/5.5 WOW!Book" 2000 Peachpit Press pp. 8-17.

"XML Spy Tops as XML Editor" http://www.eweek.com/article2/0395972404100.asp Nov. 25, 2002 4 pages.

"Agent-based Software Configuration and Deployment" Thesis of the University of Colorado Online Dec. 31, 1999 retrieved from the Internet on Nov. 7, 2003: <http://www.cs.colorado.edu/users/rickhall/documents/ThesisFinal.pdf> 169 pages.

"Mapping and Displaying Structural Transformations between XML and PDF" DocEng '02 Nov. 8-9, 2002 Copyright 2002 ACM 1-58113-597-7/02/0011 pp. 95-102.

"Tsbiff—tildeslash biff—version 1.2.1" Internet Document [Online] Jun. 1999 URL: http://web.archive.org/web/19990912001527/http://www.tildeslash.com/tsbiff/.

"Micro-Firewalls for Dynamic Network Security with Distributed Intrusion Detection"; IEEE INternational Symposium on Network Computing and Applications; 2001; pp. 68-79.

"Specifying Runtime Environments and Functionalities of Downloadable Components Under the Sandbox Mode"; International Symposium on Principles of Software Evolution; 2000; pp. 138-142.

"An Efficiently Updatable Index Scheme for Structured Documents" 1998 IEEE pp. 991-996.

"Immediate and Partial Validation Mechanism for the Conflict Resolution of Update Operations in XML Databases" WAIM 2002 LNCS 2419 2002 pp. 387-396 Springer-Veriag Berlin Heidelberg 2002.

"Validation with MSXML and XML Schema" Windows Developer Magazine Jan. 2002 pp. 35-38.

"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

"Netscape Communicator 4.61 for OS/2 Warp" Software 1999 The whole software release & "Netscape—Version 4.6 [en]-010615" Netscape Screenhot Oct. 2, 2002.

"A secure conditional access system using digital signature and encryption" 2003 Digest of Technical Papers. International Conference on Consumer Electronics Jun. 2003 pp. 220-221.

"Delphi 5 Developer's Guide" Sams Publishing 1999 Chapter 31 Section: Data Streaming 6 pages.
"Validating MPEG-21 Encapsulated Functional Metadata" IEEE 2002 pp. 209-212.
"XFIG Version 3.2 Patchlevel 2 (Jul. 2, 1998) Users Manual (Edition 1.0)" Internet Document [Online] Jul. 2, 1998 XP002229137 Retrieved from the Internet: <URL: http://www.ice.mtu.edu/online_docs/xfig332/> [retrieved on Jan. 28, 2003 ].
"An Efficient and Flexible Access Control Framework for Java Programs in Mobile Terminals"; 22nd International Conference on Distributed Computing Systems Workshops; 2002; pp. 777-782.
"XML: Not a Silver Bullet But a Great Pipe Wrench" Standardview vol. 6. No. 3 Sep. 1998 pp. 125-132.
"The Open Software Description Format" Online Aug. 13, 1997 retrieved from the Internet on Nov. 7, 2003: <http://www.w3.org/TR/NOTE-OSD> 11 pages.
"Bridging XML-Schema and relational databases. A System for generating and manipulating relational databases using valid XML documents." DocEng '01 Nov. 9-10, 2001 Copyright 2001 ACM 1-58113-432-0/01/0011 pp. 105-114.
"The Component Object Model A Technical Overview" Oct. 1994 Microsoft Corp. pp. 1-14.
"Managing and Querying Multi-Version XML Data with Update Logging" DocEng '02 Nov. 8-9, 2002 Copyright 2002 ACM 1-58113-594-7/02/0011 pp. 74-81.
Han et al., WebSplitter: A Unified XML Framework for Multi-Device Collaborative Web Browsing, 2000, ACM Conference on Cimputer Supported Cooperative Work, 10 pages.
IBM: Stack Algorithm for Extractin Subtree from Serialized Tree, Mar. 1, 1994, TDB-ACC-NONN94033, 3 pages.
Altova et al. XML Spy, XML integrated Development Environments, Altova Inc., 2002, pp. 1-18.
Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
Altova, "User Reference Manual Version 4.4, XML Spy suite 4.4," Atova Ges.m.b.H & Altova, Inc., May 24, 2002, pages cover, Copyright p. 1-565.
Beauchemin, Dave "Using InfoPath to Create Smart Forms", Retrieved from the Internet at http://www.microsoft.com/office/infopath/prodinfo/using.mspx on Jan. 21, 2007,(Mar. 27, 2003).
Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Dubinko, Micah "XForms and Microsoft InfoPath", Retrieved from the Internet at http://www.xml.com/lpt/a/1311 on Jan. 21, 2007,(Oct. 29, 2003).
Udell, Jon "InfoPath and XForms", Retrieved from the Internet at http://weblog.infoworld.com/udell/2003/02/26.html,(Feb. 26, 2003).
Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Singh, Darshan "Microsoft InfoPath 2003 By Example", Retrieved from the Internet at http://www.perfectxml.com/InfoPath.asp on Jan. 21,2007,(Apr. 20, 2003).
Raman, T. V., et al., "XForms 1.0", (Dec. 2001),Section 1-12.2.3 & Appendices A-G.
"Enter Key", Retrieved from the Internet at http://systems.webopedia.com/TERM/Enter_key.html on Dec. 20, 2006.
Lehtonen, Miro et al., "A Dynamic User Interface for Document Assembly", Department of Computer Science, University of Helsinki,(Nov. 2002).
Rees, Michael J., "Evolving the Browser Towards a Standard User Interface Architecture", School of Information Technology, Bond University, Australia,(2001).
"Microsoft Visual Basic 5.0 Programmer's Guide", *Microsoft Press*, (1997),pp. 42-43, 54-58.
Nelson, Joe "Client-side Form Validation Using JavaScript", *Developer Advisory*, (Sep. 21, 2001).
Borland, Russo "Running Microsoft Word 97", 314-315, 338, 361-362, 390, and 714-719.
"Microsoft Word 2000", Screenshots,(1999),1-5.
Brabrand, et al., "Power Forms Declarative Client-side Form Field Validation",(2002),1-20.
Anat, Eyal et al., "Integrating and Customizing Hererogeneous E-Commerce Applications", The VLDB Journal—The International Journal on Very Large Data Bases, vol. 10, Issue 1,(Aug. 2001),16-38.
Adams, Susie et al., "BizTalk Unleashed", Sams publishing, 2002, first printing Mar. 2001,1-2, 31-138.
Vasters, Clemens F., "BizTalk Server 2000 A Beginner's Guide", Osborne/McGraw-Hill,(2001),1-2, 359-402.
Halberg, Bruce et al., "Using Microsoft Excel 97", (1997),191-201, 213-219.
Villard, et al., "An Incremental XSLT Transformation Processor for XML Document Manipulation", http://www2002.org/CDROM/refereed/321, Printed on May 18, 2007,(May 2002),25 pages.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).
"Microsoft Word 2000 Screenshots", (2000),11-17.
XMLSPY, "XmlSpy 2004 Enterprise Edition Manual", Altova,(May 17, 2004),1-25, 220-225.
Stylusstudio, "StylusStudio: XPath Tools", 2004-2007, StylusStudio,1-14.
Dodds, "Toward an XPath API", xml.com,(May 7, 2001),1-3.
Altova, "Altova Tools for XPath 1.0/2.0", Altova,1-12.
"Microsoft Word 2000 Screenshots", Word,(2000),1-17.
Hu, et al., "A Programmable Editor for Developing Structured Documents base on Bidirectional Transformations", ACM,(Aug. 2004),178-179.
Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.
Bradley, Neil "The XML Companion, Third Edition", *Published by Addison Wesley Professional*, http://proquest.safaribooksonline.com0201770598, http,(Dec. 12, 2001),1-18.
Klarlund, Nils "DSD: A Schema Language for XML", *ACM, FSMP Portland Oregon*, (2000),101-111.
Watt, Andrew "MIcrosoft Office Infopath 2003 Kick Start", (*Published by Sams*) Print ISBN-10:0-672-32623-X, (Mar. 24, 2004),1-57.
Pacheco, Xavier et al., "Delphi 5 Developer's Guide", Sams Publishing. Chapter 31, Section: Data Streaming,(1999),4.
Kay, Michael "XSL Transfornmations (XSLT) Version 2.0", http://www.w3.org/TR/2005/WD-xslt20-20050404. (04/205), 1-374.

\* cited by examiner

| Reference No. | | Date Ordered | |
| Charge To | | Date Requested | |

Submitted By

| Name | | Address 1 | |
| ID Number | | Address 2 | |
| Email Address | | City | |
| Telephone # | | State/Province | |
| | | Zip/Postal Code | |
| | | Country/Region | |

Fig. 2

| Descriptor | Control ID | Parameter(s) | Value | New Control ID |
|---|---|---|---|---|
|  |  |  |  |  |
|  |  |  |  |  |
|  |  |  |  |  |
|  |  |  |  |  |

METHODS AND SYSTEMS FOR EXCHANGING AND RENDERING FORMS

TECHNICAL FIELD

This invention relates to methods and systems for exchanging and rendering forms on computing devices.

BACKGROUND

Conventional form-rendering systems, such as those that render HTML forms, utilize a simple protocol to communicate between a client device on which the form is rendered and manipulated by a user, and a server that processes and provides data for rendering on the client device. More specifically, client devices in this type of environment typically send data to the server in the form of name-value pairs. The name portion of the name-value pair corresponds to a particular control in the form (such as a field in which the user might enter their name or address), and the value portion of the name-value pair corresponds to data that appears in a control.

Typically, the server has been responsible for figuring out which data has changed and then, responsively, taking the appropriate action such as modifying the form, and then returning HTML data to the client device which can then be rendered for the user.

This simple protocol leaves much to be desired and has many shortcomings not the least of which include the inability to provide or support a rich, dynamic user experience, the inability to scale in a desirable manner, and taxing server resources.

SUMMARY

Various embodiments can support a richly dynamic form environment that permits editing on the client side and can alleviate many of the server-imposed processing complexities that have existed in the past. In at least some embodiments, complex editing scenarios permit users to make complex editing changes on a form, and have those editing changes captured and rendered on the client side for later communication to the server. Particular aspects of at least some of the embodiments can permit scalability, and can, in at least some instances, be employed in the context of a wide variety of browsers having different levels of capability, e.g. "thin" and "thick" browsers.

DETAILED DESCRIPTION

Overview

Various embodiments described below can support a richly dynamic form environment that permits editing on the client side and can alleviate many of the server-imposed processing complexities that have existed in the past. In at least some embodiments, complex editing scenarios permit users to make complex editing changes on a form, and have those editing changes captured and rendered on the client side for later communication to the server. Particular aspects of at least some of the embodiments described below can permit scalability, and can, in at least some instances, be employed in the context of a wide variety of browsers having different levels of capability, e.g. "thin" and "thick" browsers.

Exemplary Computing Environment

Figure 1:
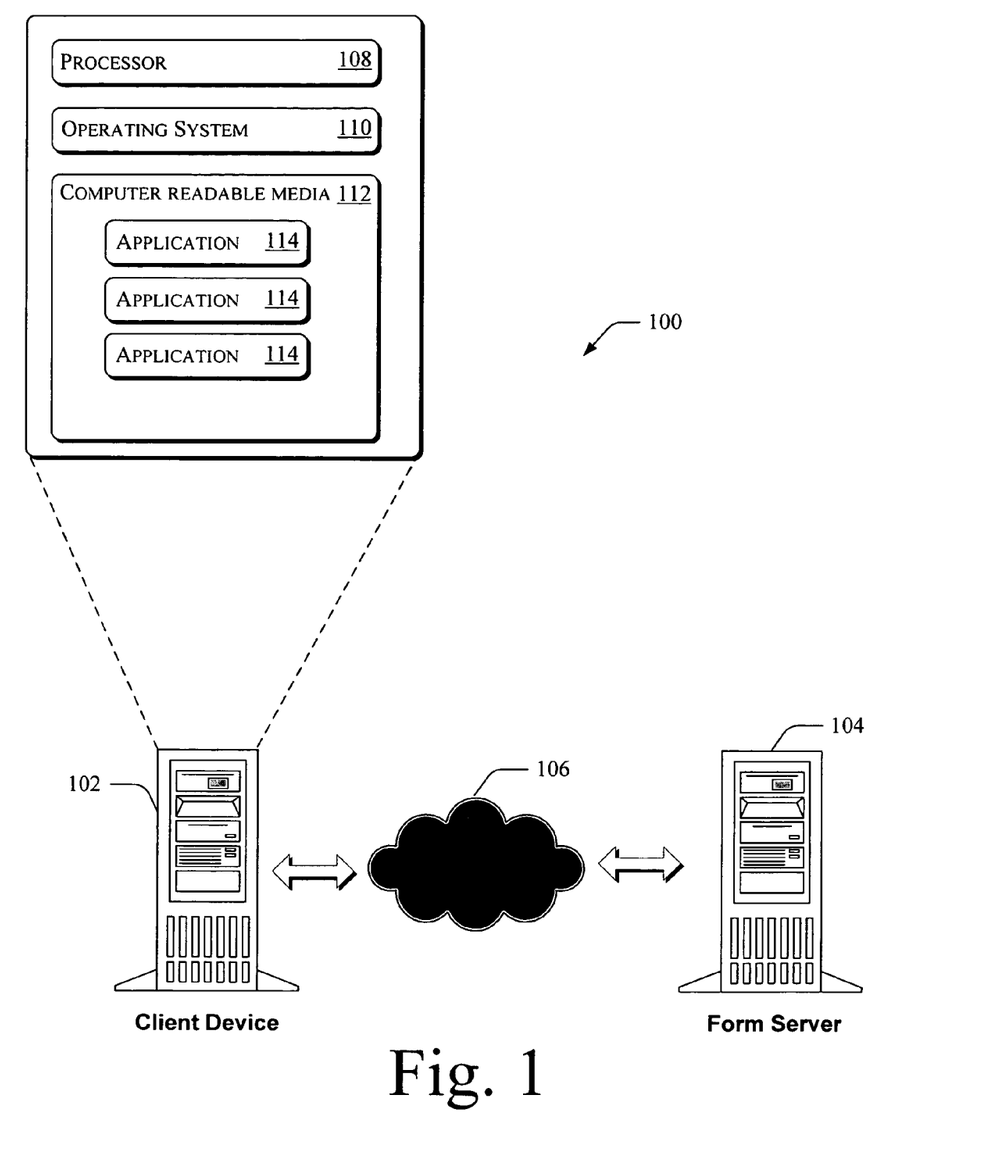
FIG. 1 illustrates an exemplary client/server computing environment in connection with which various embodiments can be implemented.

Preliminarily, the embodiments about to be described can be utilized in connection with a client/server computing environment, such as the one shown generally at 100. Environment 100 includes, in this example, a client computing device 102 that communicates with one or more servers 104 which, in this example can comprise form servers.

In the illustrated and described embodiment, computing device 102 communicates with server(s) 104 via a communication network 106, such as an intranet or the Internet. Computing device 102 comprises at least one or more processors 108, an operating system 110, one or more computer-readable media 112 and one or more applications 114 embodied on the computer-readable media 112. A more detailed description of an exemplary computing device appears at the end of this document under the heading "Exemplary Computing Device".

In this particular example, one of application 114 comprises a user agent such as a web browser. The user agent allows a user to interact with a form that is provided by form server 104. In the context of a user agent that comprises a web browser, the user agent enables a user to access the Internet and interact with form server 104 to receive and edit a form.

It is to be appreciated and understood that other well-known computing systems, environments, and/or configurations can be utilized in connection with the embodiments that are about to be described. For example, such computing systems, environments and/or configurations can include, without limitation, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The embodiments about to be described can be described in the general context of, or implemented with, computer-executable instructions, such as program modules, executed by one or more computers or other devices. Generally, program modules include routines, programs, objects, components, data structures and etc. that perform particular tasks or implement particular abstract data types. The functionality of the program modules may be combined or distributed in various embodiments, including those described below.

These computer-executable instructions can comprise or be embodied on computer-readable media 112 which can comprise, for example, computer storage media and communication media. Computer storage media includes volatile and nonvolatile, removable and non-removable media implemented in any method or technology for storage of information. This stored information can comprise computer-readable instructions, data structures, program modules, and other data. Computer storage media comprise, by way of example, RAM, ROM, EEPROM, flash memory or other memory technology, CD-ROM, digital versatile disks (DVDs) or other optical storage, magnetic media storage devices, or any other medium that can be used to store the desired information.

Communication media typically embodies computer-readable instructions, data structures, program modules, or other data in a modulated data signal (e.g., a carrier wave or other transport mechanism) and includes any information delivery media. The term "modulated data signal" means a signal that has one or more of its characteristics set or changed in such a manner as to encode information in the signal. Communication media can comprise, for example, wired media, such as a wired network or direct-wired connection, and wireless media, such as acoustic, RF, infrared, and other wireless media. Combinations of any of the above can also be included within the scope of computer-readable media.

Capturing User Form Modifications

In at least one embodiment, when a user interacts with a particular form, a user agent executing on the client device keeps track of the changes made to the form, as well as the order of the changes or events that are generated by the user's interaction. The user agent can then, periodically, communicate those changes, in the order that the changes occurred, to the appropriate form server for processing. In at least some embodiments, the user agent can make the changes directly on the form that the user interacts with. For example, if a user manipulates the structure of the form, at least some user agents can implement the structural change and then, at some later time communicate those changes to the server for processing.

When the form server receives the changes, the server can then process the changes and send appropriate data to the client device for rendering. More specifically, when the server receives the data that describes the user-made changes and the order in which the changes were made to a form served up by the server, the server can process the data to produce processed data that can be sent to the client device and used to render an updated form on the client device. Examples of how this can be done are described below.

In at least one embodiment, only the changes are sent to the server, rather than all of the data associated with the entire form and its controls. In turn, server resources and overhead are conserved because the server does not have to process data that is unassociated with the changes or modifications that the user made to the form.

Figure 2:
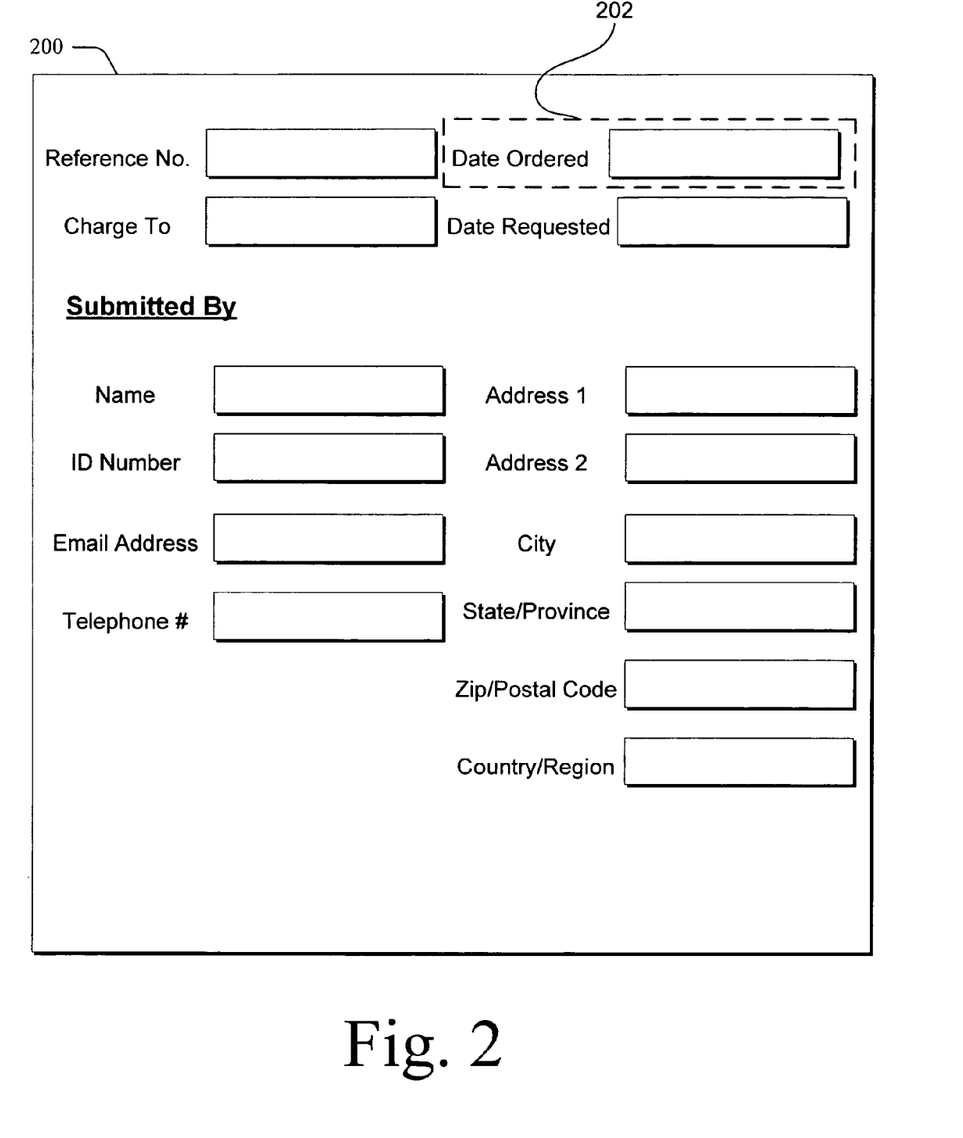
FIG. 2 illustrates an exemplary form that is described in the context of one or more embodiments.

As an example, consider FIG. 2 which shows an exemplary form 200 in the form of a web form that a user might access at a web site when, for example, attempting to place an order for a particular product. In this example, form 200 includes a number of controls, one of which is indicated at 202 in the form of a "Date Ordered" field in which the user can enter the date that a particular order is submitted. Assume also that the user has used this web site before and is known (along with their pertinent billing information) to the site. In this example, the only new information that might be entered in the form is information that is entered into the "Reference No.", "Date Ordered" and "Date Requested" fields. That is, assume that form 200 populates the form with the information that it already maintains for a particular user and that when the web site processes a particular form, it knows who sent the form.

In accordance with at least one embodiment, only the form changes (and the order in which they occur) are communicated to the server. That is, there are a number of controls whose associated information does not change. In this case, information associated with those controls is not communicated to the server. Hence, in this example, only information associated with the controls "Reference No.". "Date Ordered" and "Date Requested" is eventually communicated to the server.

Consider further that the user wishes to modify the structure of the form in some way. For example, assume that the user wishes to insert an additional address control (e.g. "Address 3"). In the present embodiment, the user can manipulate the structure of the form and have those manipulations tracked and implemented by the user agent which, in this example, is a web browser. Eventually, as will be discussed, those manipulations as well as other changes to the form can be articulated to the server so that the server can provide updated data back to the client device for rendering.

The Event Log

Although the user agent can maintain the user-induced modifications of a particular form in any suitable structure, in at least one embodiment, the agent maintains an event log which maintains a list of changes or events that have occurred. Periodically, the user agent articulates the event log to the server so that the server can process the event log as described in more detail below. By maintaining the list of changes and/or events on the client device, the client device can implement the changes in a generally contemporaneous manner to provide the user with almost immediate feedback, without necessarily having to communicate with the server to affect the changes. In this way, the user can see their changes implemented without the changes being affected by the communication latency between the client device and the server. In addition, because the changes or events can be tracked and then periodically provided to the server, the server is not called upon to process, in a piecemeal manner, every single change that the user makes every time they make a change or generate an event. Hence, this approach can conserve server processing resources.

In the illustrated and described embodiment, the event log is structured in a format that is powerful and extensible enough to support arbitrary editing actions. This enables the browser, in at least some instances, to support such editing actions without having to communicate with the server. In the illustrated and described embodiment, the event log can naturally scale to the capabilities of a particular browser. For browsers that are less functional (i.e. "thin" browsers), there is typically more frequent communication with a particular server. An example of this is given below. For browsers that are more functional, there is typically less frequent communication with a particular server and hence, the event logs can be longer.

Figure 3:
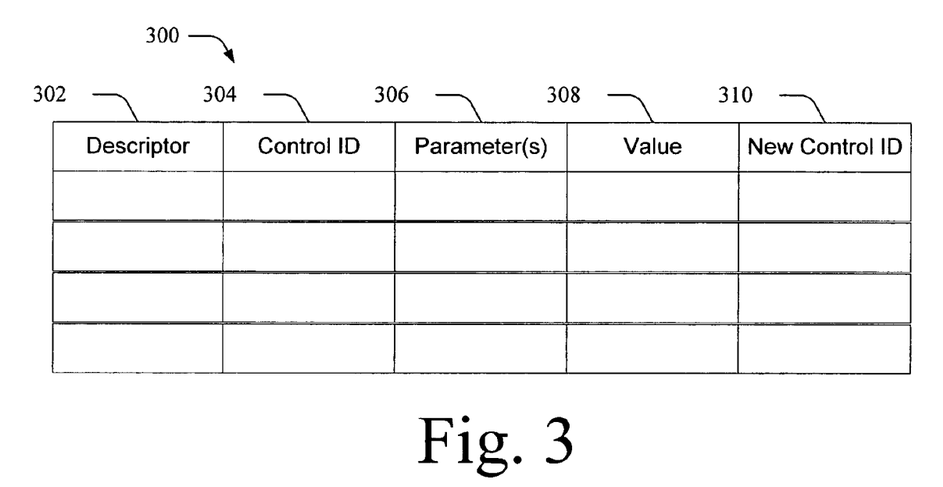
FIG. 3 illustrates an exemplary event log in accordance with one embodiment.

FIG. 3 illustrates an exemplary event log in accordance with one embodiment, generally at 300. In this example, the event log contains a number of fields. For example, a descriptor field 302 contains a descriptor or command for a particular action that a user takes. Examples of descriptors include, by way of example and not limitation, the following:

| Descriptors | Description |
| --- | --- |
| StartEventLog(serialId) | Starts the event log. Used by the server to make sure logs are submitted in order. |
| Change(controlId, newValue) | Performs an "in-place" change of a control. |
| Click(buttonId, containerId) | Handles a button click. |
| Submit( ) | Performs a server-side "submit" operation (such as submit to a secondary data source). |
| XCollectionInsert(containerId, beforeSiblingId, newControlId) | Performs an insertion of a new control. |
| XCollectionInsertBefore(containerId, beforeSiblingId, newControlId) | Performs an insertion of a new control. |
| XCollectionInsertAfter(containerId, afterSiblingId, newControlId) | Performs an insertion of a new control. |
| XOptionalInsert(containerId, beforeSiblingId, newControlId) | Performs an insertion of a new control. |

-continued

| Descriptors | Description |
| --- | --- |
| XCollectionRemove(controlId) | Removes a single item of a repeating collection. |
| XCollectionRemoveAll(controlId) | Removes all items of a repeating collection. |
| XOptionalRemove(controlId) | Removes an optional item. |
| VerifyChange(controlId, expectedValue) | Implicit Change: verifies that a client-side change that was caused by a side-effect was also triggered on the server. |
| VerifyValidation(controlId, expectedErrors) | Declarative validation: verifies that a validation error triggered by the client was also triggered by the server. |

A control ID field 304 contains values associated with the identifier for a control to which the editing action is to be applied. A parameters field 306 includes the parameters for a particular editing action. For example, some editing actions may require a text string to be inserted for a particular editing action. In this case, the parameters field would include a text string value. Another example would be a button click, in which case the parameters would include the button id and the button's current container. Yet another example would be an insertion of a new control, where the parameters would include a container for insertion, relative sibling and a name for a new control.

A value field 308 maintains entries associated with new control values. This assists the server in maintaining the state of the controls throughout a user's editing actions. This assists the server in maintaining the state of the controls throughout a user's editing actions. A new control ID field 310 is provided and, if new controls are created by the user because of an editing action, holds an identifier for the new control. This permits subsequent entries in the event log to refer to the new control(s).

It is to be appreciated and understood that the exemplary event log illustrated in FIG. 3 is not to be used to limit application of the claimed subject matter. Rather, other event logs can be utilized without departing from the spirit and scope of the claimed subject matter.

Exemplary Method

Figure 4:
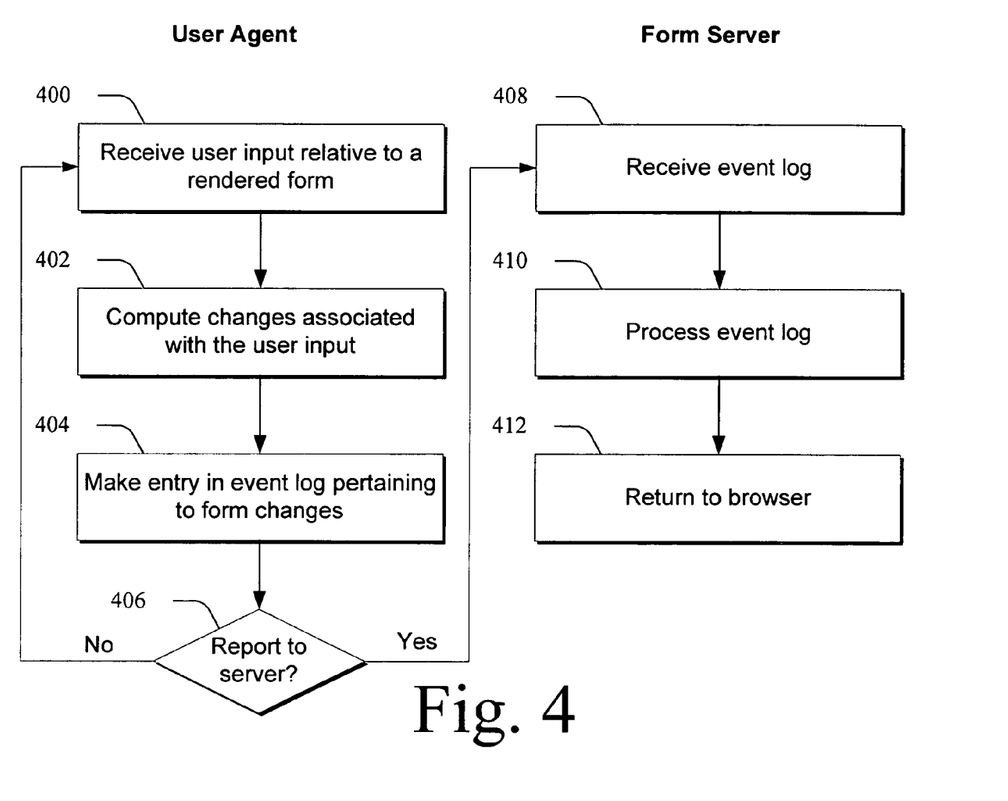
FIG. 4 is a flow diagram that describes steps in the method in accordance with one embodiment.

FIG. 4 is a flow diagram that describes steps in a method in accordance with one embodiment. The method can be implemented in connection with any suitable hardware, software, firmware or combination thereof. In but one embodiment, and as diagrammatically indicated, some aspects of the described method can be implemented in connection with a suitably configured user agent such as a web browser, and other aspects of the described method can be implemented in connection with a suitably configured form server.

Step 400 receives user input relative to a rendered form. The user input can be received in any suitable form. For example, the user may type a text string into a field associated with a particular control, the user can click on a particular control and the like. Step 402 computes changes to the form associated with the received input and implements the changes on the form. The changes can involve, for example, modifications to the controls or data fields associated with the control or, in at least some embodiments, can involve changing, in some way, the structure of the form. For example, the user may wish to add a column or row to a particular table on the form. Alternately or additionally, the user may wish to add a button or some other type of control to a particular form. In this case, step 402 would compute the form change and implement the change on the form.

Step 404 makes an entry in an event log that pertains to the form changes spawned by the user's input. It is to be appreciated and understood that the entries in the event log are made serially and track the input provided by the user. That is, the entries in the event log capture the nature of the changes and the order in which the changes occur. But one example of an event log is provided above in FIG. 3.

Step 406 ascertains whether the event log should be reported to the server. Any suitable criteria can be utilized to ascertain whether the event log should be sent to the server. For example, some browsers may have a practical size limit on the size of the event log. In this case, when the size of the event log reaches some threshold, it can be sent to the server. Alternately or additionally, some browsers may be "thin" browsers in the sense that they need to communicate with the server frequently because, for example, they may not be able to implement certain changes that the user desires to make. For example, some browsers may not be able to make structural changes to a particular form. In this case, these thin browsers can maintain an event log and, when a desired user action cannot be performed by the browser, the browser can send the event log, along with an indication of the desired action to the server. Alternately or additionally, there may be a lack of sufficient information on the client device such that the event log should be reported to the server. For example, a user may trigger an action that requires a database lookup; or a user may trigger a calculation for which all data is not available. Alternately or additionally, the user may make a change to the form that radically alters the presentation in which case some browsers may not be able to implement the change. Alternately or additionally, in some cases, browsers may not be able to implement advanced functionality, such as spellchecking and the like in which case, the event log might be reported to the server.

If, depending on whatever criterion is used, the event log need not be reported to the server, then the method returns to step 400. If, on the other hand, the event log is to be reported to the server, then the method reports the event log to the server (following the "Yes" branch in the figure).

Step 408, performed by the server, receives the event log that is reported from the browser. Step 410 processes the event log and step 412 returns data to the browser that can be used to render the form.

The event log can be processed by the server in any suitable way. For example, in one embodiment, when the server receives the event log, it can return back HTML to the browser that is utilized to render the view that the user sees. Alternately, the server can process the event log and return back data for the appropriate controls that are to be rendered by the browser. For example, in the case of a "thin" browser, the server might return all of the HTML that is to be processed and used to render the form on the client device. Alternately, for robust browsers that possess robust functionality, the server may just return the appropriate data associated with the appropriate controls that are to be rendered.

From a practical standpoint and in connection with one embodiment, once the server receives the event log, it first parses the event log into individual events and invokes the appropriate form for each event. In this embodiment, the forms are based on XML data. Accordingly, the server instantiates the form's XML DOM in memory, and then processes each event. For each event, the control has an identification or ID (as noted in the event log above). The control ID for a particular event is processed and mapped onto a corresponding node in the XML DOM. The server then performs the operation indicated in the event log entry. This provides modified XML data which reflects the modifications made by the user.

When the processing is finished insofar as event log entries are concerned, the resultant XML data can either be processed, as by applying suitable transforms to the XML data, to recreate the form view HTML which is sent to the browser (in the event of "thin browsers"), or the actual data for the associated controls can be sent to the browser (in the event of "thick" browsers).

Exemplary Computing Device

Figure 5:
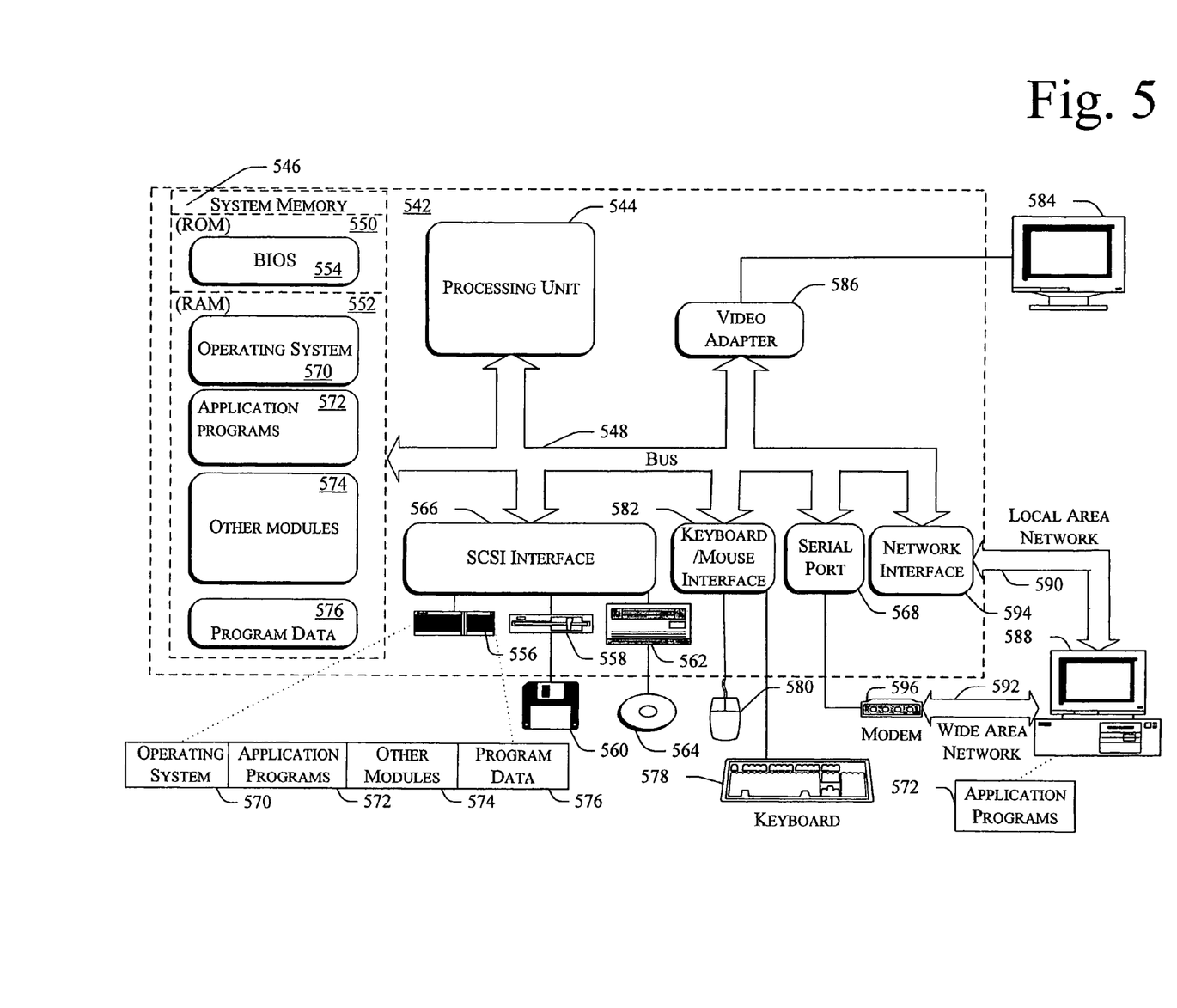
FIG. 5 illustrates an exemplary computing device that can be used to implement one or more of the described embodiments.

FIG. 5 shows an exemplary computing device that can be used to implement the processes described above. Computing device 542 comprises one or more processors or processing units 544, a system memory 546, and a bus 548 that couples various system components including the system memory 546 to processors 544. The bus 548 represents one or more of any of several types of bus structures, including a memory bus or memory controller, a peripheral bus, an accelerated graphics port, and a processor or local bus using any of a variety of bus architectures. The system memory 546 comprises read only memory (ROM) 550 and random access memory (RAM) 552. A basic input/output system (BIOS) 554, containing the basic routines that help to transfer information between elements within computing device 542, such as during start-up, is stored in ROM 550.

Computing device 542 can further comprise a hard disk drive 556 for reading from and writing to a hard disk (not shown), a magnetic disk drive 558 for reading from and writing to a removable magnetic disk 560, and an optical disk drive 562 for reading from or writing to a removable optical disk 564 such as a CD ROM or other optical media. The hard disk drive 556, magnetic disk drive 558, and optical disk drive 562 are connected to the bus 548 by an SCSI interface 566 or some other appropriate interface. The drives and their associated computer-readable media provide nonvolatile storage of computer-readable instructions, data structures, program modules and other data for computer 542. Although the exemplary environment described herein employs a hard disk, a removable magnetic disk 560 and a removable optical disk 564, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 556, magnetic disk 560, optical disk 564, ROM 550, or RAM 552, including an operating system 570, one or more application programs 572 (such as a user agent or browser), other program modules 574, and program data 576. A user may enter commands and information into computer 542 through input devices such as a keyboard 578 and a pointing device 580. Other input devices (not shown) may comprise a microphone, joystick, game pad, satellite dish, scanner, or the like. These and other input devices are connected to the processing unit 544 through an interface 582 that is coupled to the bus 548. A monitor 584 or other type of display device is also connected to the bus 548 via an interface, such as a video adapter 586. In addition to the monitor, personal computers typically comprise other peripheral output devices (not shown) such as speakers and printers.

Computer 542 commonly operates in a networked environment using logical connections to one or more remote computers, such as a remote computer 588. The remote computer 588 may be another personal computer, a server, a router, a network PC, a peer device or other common network node, and typically comprises many or all of the elements described above relative to computer 542. The logical connections depicted in FIG. 5 comprise a local area network (LAN) 590 and a wide area network (WAN) 592. Such networking environments are commonplace in offices, enterprise-wide computer networks, intranets, and the Internet.

When used in a LAN networking environment, computer 542 is connected to the local network through a network interface or adapter 594. When used in a WAN networking environment, computer 542 typically comprises a modem 596 or other means for establishing communications over the wide area network 592, such as the Internet. The modem 596, which may be internal or external, is connected to the bus 548 via a serial port interface 568. In a networked environment, program modules depicted relative to the personal computer 542, or portions thereof, may be stored in the remote memory storage device. It will be appreciated that the network connections shown are exemplary and other means of establishing a communications link between the computers may be used.

Generally, the data processors of computer 542 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Conclusion

The various embodiments described above can support a richly dynamic form environment that permits editing on the client side and can alleviate many of the server-imposed processing complexities that have existed in the past. In at least some embodiments, complex editing scenarios permit users to make complex editing changes on a form, and have those editing changes captured and rendered on the client side for later communication to the server. Particular aspects of at least some of the embodiments described above can permit scalability, and can, in at least some instances, be employed in the context of a wide variety of browsers having different levels of capability, e.g. "thin" and "thick" browsers.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
    enabling a user to interact with a form on a client device;
    keeping track of changes made to the form, as well as an order in which the changes are made in an event log;

implementing one or more of the changes made to the form without requiring communication with a form server, at least one of the changes being a structural change to the form associated with one or more of:

modifying a control in the form;

inserting a control in the form; or removing a control from the form; and automatically and periodically communicating the changes and the order to the form server without the user's intervention, wherein the communicating is performed by a user agent comprising a web browser which determines, based at least in part on predefined criteria, when said communicating occurs, wherein said criteria is associated with at least one of:

the event log's size;

the implementing one or more of the changes; or implementing functionality associated with the form.

2. The method of claim 1, wherein periodically communicating comprises communicating only the changes and the order to the form server.

3. The method of claim 1, wherein periodically communicating comprises not communicating data associated with form controls that are not affected by a user's interaction.

4. One or more computer-readable storage media having computer-readable instructions embodied as a web browser thereon which, when executed by one or more processors, cause the one or more processors to implement a method comprising:

enabling a user to interact with a form on a client device;

keeping track of changes made to the form, as well as an order in which the changes are made in an event log, wherein at least one of the changes comprises a change to the structure of the form associated with at least one of:

modifying a control in the form;

inserting a control in the form; or removing a control from the form;

implementing at least one of the changes made to the form without requiring communication with a form server;

automatically and periodically communicating the changes and the order to the form server without the user's intervention, wherein the communicating is performed by the web browser; and determining, based at least in part on predefined criteria, when said communicating occurs, wherein determining is performed by the web browser, and wherein said criteria is associated with at least one of:

the event log's size;

the implementing one or more of the changes; or implementing functionality associated with the form.

5. The one or more computer-readable storage media of claim 4, wherein periodically communicating comprises communicating only the changes and the order to the form server.

6. The one or more computer-readable storage media of claim 4, wherein periodically communicating comprises not communicating data associated with form controls that are not affected by a user's interaction.

* * * * *